US011997338B1

(12) United States Patent
Koceski et al.

(10) Patent No.: US 11,997,338 B1
(45) Date of Patent: May 28, 2024

(54) ENHANCED PARSING OF MEDIA MANIFESTS FOR STREAMING MEDIA

(71) Applicant: Amazon Technologies, Inc., Seattle, WA (US)

(72) Inventors: Kyle Koceski, Seattle, WA (US); Mairo Pedrini, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/403,430

(22) Filed: Aug. 16, 2021

(51) Int. Cl.
*H04N 21/2662* (2011.01)
*H04L 65/65* (2022.01)
*H04L 65/75* (2022.01)
*H04N 21/81* (2011.01)
*H04N 21/845* (2011.01)
*H04N 21/8543* (2011.01)

(52) U.S. Cl.
CPC ......... *H04N 21/2662* (2013.01); *H04L 65/65* (2022.05); *H04L 65/75* (2022.05); *H04N 21/8106* (2013.01); *H04N 21/812* (2013.01); *H04N 21/845* (2013.01); *H04N 21/8543* (2013.01)

(58) Field of Classification Search
CPC ........... H04N 21/2662; H04N 21/8106; H04N 21/812; H04N 21/845; H04N 21/8543; H04L 65/75; H04L 65/65
See application file for complete search history.

(56) References Cited

U.S. PATENT DOCUMENTS

| | | | |
|---|---|---|---|
| 2012/0117620 A1* | 5/2012 | Cassidy | H04N 21/2543 726/3 |
| 2012/0290644 A1* | 11/2012 | Gabin | H04L 65/762 709/203 |
| 2015/0127845 A1* | 5/2015 | Phillips | H04N 21/26258 709/231 |
| 2016/0073176 A1* | 3/2016 | Phillips | H04N 21/23418 725/35 |
| 2019/0313157 A1* | 10/2019 | Fitzgerald | H04N 21/2747 |
| 2020/0301594 A1* | 9/2020 | Connetable | G06F 3/0644 |

* cited by examiner

*Primary Examiner* — Joshua D Taylor
(74) *Attorney, Agent, or Firm* — Eversheds Sutherland (US) LLP (57) ABSTRACT

Devices, systems, and methods are provided for enhanced parsing of manifest files for streaming media. A method may include receiving, by a media player, a first media manifest including tags indicative of first temporal segments for media content; identifying, using a parser, a first tag indicative of a first temporal segment; identifying, using the parser, a second tag indicative of a second temporal segment; parsing, using the parser, the first tag; based on at least one of the parsing or a user preference indicative of a starting location for playback of first media content of the media content or a preferred bandwidth, refraining from parsing the second tag; retrieving, by the at least one processor, based on a time associated with the first temporal segment, an address of the first video content; and presenting, by the at least one processor, the first media content based on the address.

20 Claims, 8 Drawing Sheets

ENHANCED PARSING OF MEDIA MANIFESTS FOR STREAMING MEDIA

BACKGROUND

Media players often rely on a manifest file to identify content available to stream. As the size of manifest files grows, the parsing of the manifest files requires more time and may undermine a viewer's experience. For example, the startup time to commence playback of streaming video may be delayed due to increased time required to parse a manifest file.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for parsing media manifests for streaming media.

Streaming media today often uses a manifest file which references segments available for streaming (including segments available at multiple bitrates). Common manifest formats today include Microsoft Smooth Streaming (MSS), HTTP Live Streaming (HLS), and Dynamic Adaptive Streaming over HTTP (DASH). For example, a DASH manifest files may use an mpd file extension, a Smooth Streaming manifest file may use an ism or isml file extension, and an HLS manifest file may use an m3u8 file extension.

Manifest files include addresses (e.g., uniform resource locators—URLs) to segments of video (e.g., portions of video comprising video frames) to be presented. Because the segments may have multiple formats of varying quality (e.g., ultra-high definition, high definition, standard definition, etc.) that correspond to an available bandwidth and resolution used to stream the video, the addresses may be different for the various qualities of segments. For example, a standard definition segment may have a different URL than a high definition version of the segment.

Manifest files may include segment tags (S-tags) to define temporal segments (e.g., increments of time) during which video content (e.g., segments of video frames of video titles and advertisements) can be presented. Video players may use parsers (e.g., standard Document Object Model (DOM) parsers, Simple API for XML (SAX) parsers, custom parsers, etc.) to parse manifest files. As parsers parse a manifest file, they may parse the tags, identifying the temporal segments, the starting and end times of the temporal segments (e.g., to use to determine when to request and play content), and addresses of content that, when executed by the player, result in playback of the corresponding content (in a corresponding quality/format).

Manifest files are becoming increasingly large and may be updated frequently, especially to account for dynamic advertisement insertion for live streaming. In particular, as advertisements are inserted into a video stream, the number of temporal segments of the manifest file may increase to include the added temporal segments. Advertisements also may be used at a startup of VOD content, during VOD content, and just-after-broadcasting of VOD content. Parsing and re-parsing manifest files may be time-intensive, especially as the size of manifest files increases. The time required to parse a large manifest file may delay the initial startup time of VOD or live content, for example.

There is therefore a need for enhanced parsing of video manifests for video streaming.

In one or more embodiments, a media player (e.g., media including video and/or audio) parser may skip (e.g., refrain from parsing), completely or temporarily (e.g., at least until a subsequent manifest is provided), parsing of some portions (e.g., s-tags) of a manifest file to optimize manifest file parsing time. In particular, the parser may skip the parsing of duplicative segment timelines indicated by s-tags (e.g., may parse an s-tag of a temporal segment of media of one quality/format, but skip parsing one or more other s-tags representing a temporal segment of the media in other qualities/formats, particularly when the temporal segments align in time), may skip parsing of non-updated temporal segments of a manifest (e.g., when a manifest is refreshed/updated with fragments added to and/or removed from temporal segments), or may perform on-demand parsing of child elements of a manifest file (e.g., may parse an s-tag whose temporal segment corresponds to the location at which the content is to begin playback, and may refrain from parsing a previous or subsequent s-tag whose temporal segment has already occurred in the video or will occur in the video at a later time). The details of the enhanced parsing mechanisms are described further below, and provide the benefit of reducing manifest parsing time to allow for faster commencement of playback with reduced content buffering, while allowing for parsing of tags representing temporal segments needed for immediate playback in both on-demand and live streaming applications.

In one or more embodiments, the decision whether to skip parsing a portion of a manifest file may be based on any combination of what a parser has learned from parsing and/or a user preference (e.g., a user preference for playback using a particular video resolution/quality corresponding to an available bandwidth, a user preference for where playback is to begin—live for a live-streaming event, from the beginning or at a different starting point of on-demand content, etc.). For example, a manifest may provide a set of representations for different types/quality levels (e.g., standard definition, high definition, ultra-high definition, etc.), and a representation may reference a set of temporal segments using "SegmentTimeline" that describes representation segment start times and durations. In some cases, the SegmentTimeline may be duplicated across multiple (even all) representations of a set, such as when all temporal segments for the different types/quality levels align in time (e.g., the respective standard definition, high definition, and ultra-high definition temporal segments may cover the same time period). When the temporal alignment occurs, a parser may parse one of the aligned temporal segments while skip parsing other aligned temporal segments (e.g., may parse the standard definition temporal segment while skip parsing the temporally aligned high definition and ultra-high definition temporal segments) to avoid parsing the Segment Timeline and any child elements (e.g., the S-tag elements). In addition or alternatively, the segments may correspond to different camera feeds (e.g., different vantage points/fields-of-view—perceptions), and/or to different languages. In this manner, multiple different media segments may be time-aligned, allowing for skip-parsing of some aligned segments.

During a live event, a media manifest may be refreshed to ensure that the player is updated with the latest segments added at the live edge and removed from the trailing edge. When advertisements are dynamically inserted, a manifest may include time segments that never change between successive refreshes of the manifest. In one or more embodiments, to address this scenario, the parsing strategy may result in parsing: (1) The first time period, to identify the segments which have fallen off the trailing edge; (2) Any new time period, which may include new (e.g., added) segments nearer the live edge; and (3) The last/latest time period, which includes the live edge and any new (e.g., added) segments. In this manner, skip parsing may avoid re-parsing previously parsed time periods that are unchanged in the latest manifest refresh (e.g., may refrain from re-parsing segments that were previously parsed and were unchanged—had no fragments added or removed after the segment was parsed and the manifest was subsequently refreshed).

In one or more embodiments, data in the manifest may not be needed to initialize media playback, but the data may be needed later. For example, when starting playback, a player may require only the time period that includes the live edge. In this situation, other time periods (and their temporal segments) may be skipped on the initial parse, but when a user requests a rewind or other time-skipping feature, the player may "lazily" parse tags on-demand, meaning that the parser may refrain from parsing some tags until they are needed (e.g., when playback progresses to a future temporal segment or is adjusted by a user request to rewind or skip forward in time). Similarly, initial playback quality levels at startup may be parsed based on the user's preferred quality level (or a default quality level) to minimize delays in starting the playback, while lazily parsing alternative/backup quality levels on-demand.

In one or more embodiments, the manifest may use formats other than DASH, such as HLS, for example. Similar to enhanced parsing of a DASH manifest, HLS parse skipping may be based on discontinuities and individual media segments. In particular, temporal segments may be added to a leading edge or removed from a trailing edge. Only the first trailing edge segment may need to be parsed. From the leading edge, segment addresses may be parsed backwards until a last known segment is matched. For example, if a manifest is refreshed/updated (e.g., incremented by two segments), the trailing edge may drop two segments that do not need to be re-parsed, and when the next (e.g., middle) segments are unchanged, the unchanged subsequent segments may be skipped until a next temporal segment has changed (e.g., incremented by two segments), resulting in a parsing of the changed temporal segment. In an example, if video content is playing, and one or more advertisement segments are unchanged after a manifest update, but the subsequent video after the advertisement segments has added segments, the advertisement segments may be skipped from parsing, but the subsequent video after the advertisement segments may be parsed without having to parse the previous advertisement segments.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

Figure 1:
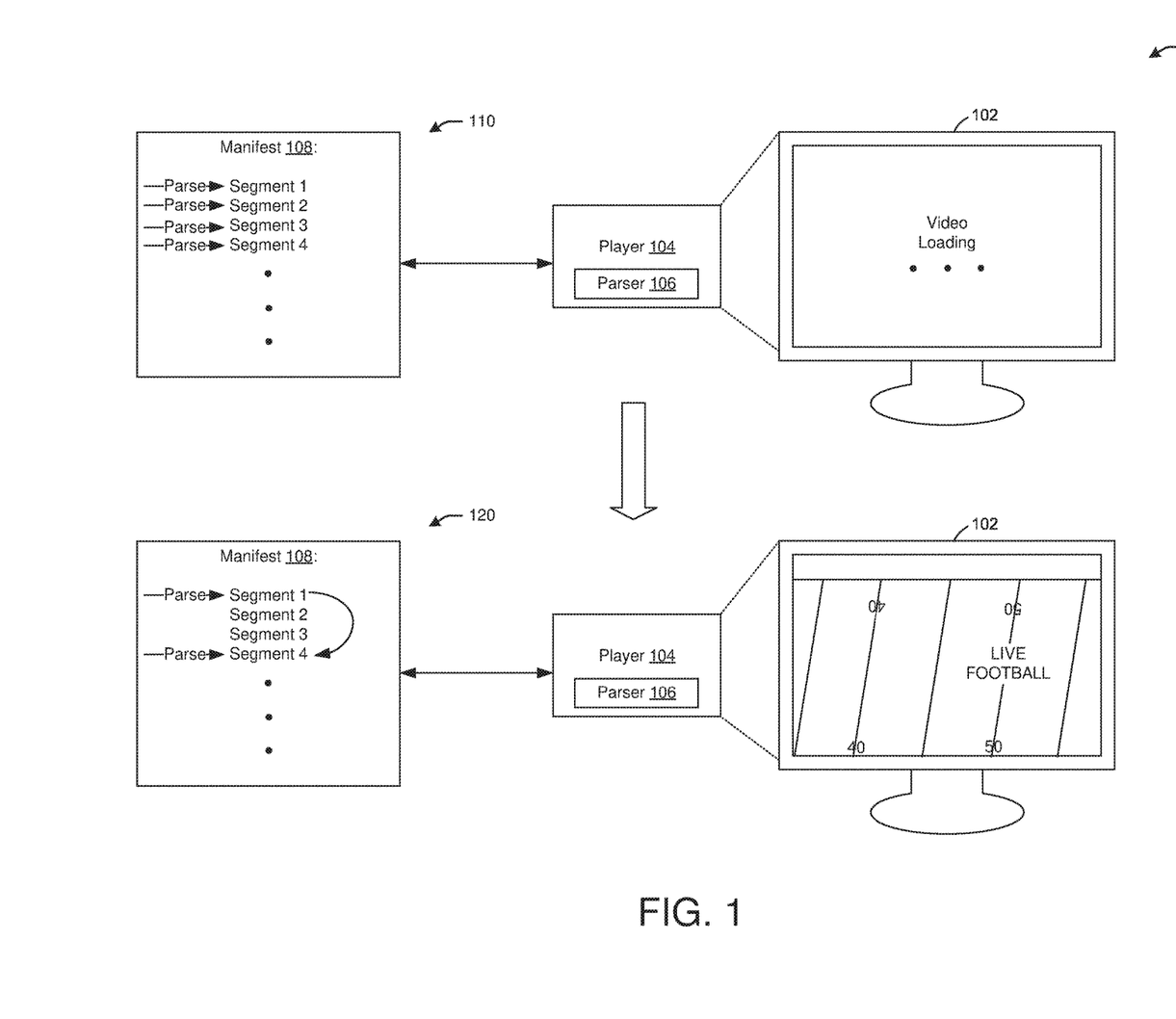
FIG. 1 illustrates an example system for parsing media manifests for streaming media, in accordance with one or more example embodiments of the present disclosure.

FIG. 1 illustrates an example system 100 for parsing media manifests for streaming media, in accordance with one or more example embodiments of the present disclosure.

Referring to FIG. 1, the system 100 may include a device 102 with or otherwise connected to a media player 104 that uses a parser 106 to parse a manifest 108. The manifest 108 may define temporal segments (e.g., segments 1-4 as shown). At step 110, the parser 106 may parse each segment of the manifest 108 even if the segments align temporally, represent unchanged segments respective to a previously parsed manifest (e.g., previously parsed by the parser 106), or whether the segments are needed to commence playback of streaming media. The result may be a delay in the initial stream as playback is selected, but the parser 106 continues to parse the manifest 108 while the viewer waits for the corresponding media of the manifest 108 to be presented.

Still referring to FIG. 1, the parsing of the manifest 108 may be enhanced at step 120. As shown, not all segments of the manifest 108 may need to be parsed by the parser 106 in order to commence playback using the device 102. In the example shown, segments 2 and 3 may be skipped (e.g., the parser 106 may refrain from parsing segments 2 and 3). In this manner, the media playback may commence faster because no all segments may need to be parsed at step 120.

In one or more embodiments, the decision whether to skip parsing and/or lazily parse a portion of the manifest 108 may be based on any combination of what the parser 106 has learned from parsing and/or a user preference (e.g., a user preference for playback using a particular media resolution/quality corresponding to an available bandwidth, a user preference for where playback is to begin—live for a live-streaming event, from the beginning or at a different starting point of VOD content, a user preference for a camera angle/field-of-view, a spoken language, etc.). For example, the segments of the manifest 108 may provide a set of representations for different types/quality levels (e.g., standard definition, high definition, ultra-high definition, etc.)

using a Segment Timeline. In some cases, the Segment Timeline may be duplicated across multiple (even all) representations of a set, such as when all temporal segments for the different types/quality levels align in time (e.g., the respective standard definition, high definition, and ultra-high definition temporal segments may cover the same time period). When the temporal alignment occurs, the parser 106 may parse one of the aligned temporal segments while skip parsing other aligned temporal segments (e.g., may parse the standard definition temporal segment while skip parsing the temporally aligned high definition and ultra-high definition temporal segments) to avoid parsing the Segment Timeline and any child elements (e.g., the S-tag elements).

During a live event, a media manifest may be refreshed to ensure that the player is updated with the latest segments added at the live edge and removed from the trailing edge. For example, the manifest 108 may represent a refreshed version of a prior manifest received by the media player 104. When advertisements are dynamically inserted into a media stream, the manifest 108 may include time segments that never change between successive refreshes of the manifest 108. In one or more embodiments, to address this scenario, the parsing strategy may result in parsing: (1) The first time period, to identify the segments which have fallen off the trailing edge; (2) Any new time period, which may include new (e.g., added) segments nearer the live edge; and (3) The last/latest time period, which includes the live edge and any new (e.g., added) segments. In this manner, skip parsing may avoid re-parsing previously parsed time periods that are unchanged in the latest manifest refresh (e.g., may refrain from re-parsing segments that were previously parsed and were unchanged—had no fragments added or removed after the segment was parsed and the manifest was subsequently refreshed). In the example shown at step 120, segments 2 and 3 may represent segments previously parsed by the parser 106 and that were not changed since having been parsed by the parser 106 (e.g., were not changed in a manifest refresh).

In one or more embodiments, data in the manifest 108 may not be needed to initialize media playback, but the data may be needed later. For example, when starting playback, the media player 104 may require only the time period that includes the live edge. In this situation, other time periods (and their temporal segments) may be skipped on the initial parse, but when a user requests a rewind or other time-skipping feature, the media player 104 may lazily parse tags on-demand, meaning that the parser 106 may refrain from parsing some tags until they are needed (e.g., when playback progresses to a future temporal segment or is adjusted by a user request to rewind or skip forward in time). Similarly, initial playback quality levels at startup may be parsed based on the user's preferred quality level (or a default quality level) to minimize delays in starting the playback, while lazily parsing alternative/backup quality levels on-demand.

In one or more embodiments, the device 102 may include a personal computer (PC), a smart home device, a wearable wireless device (e.g., bracelet, watch, glasses, ring, strap/band, patch, bandage, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, an ultra mobile device (UMD), an ultra mobile PC (UMPC), a mobile internet device (MID), an "origami" device or computing device, a device that supports dynamically composable computing (DCC), a context-aware device, a video device, an audio device, a media player, a smartphone, or the like.

Figure 2A:
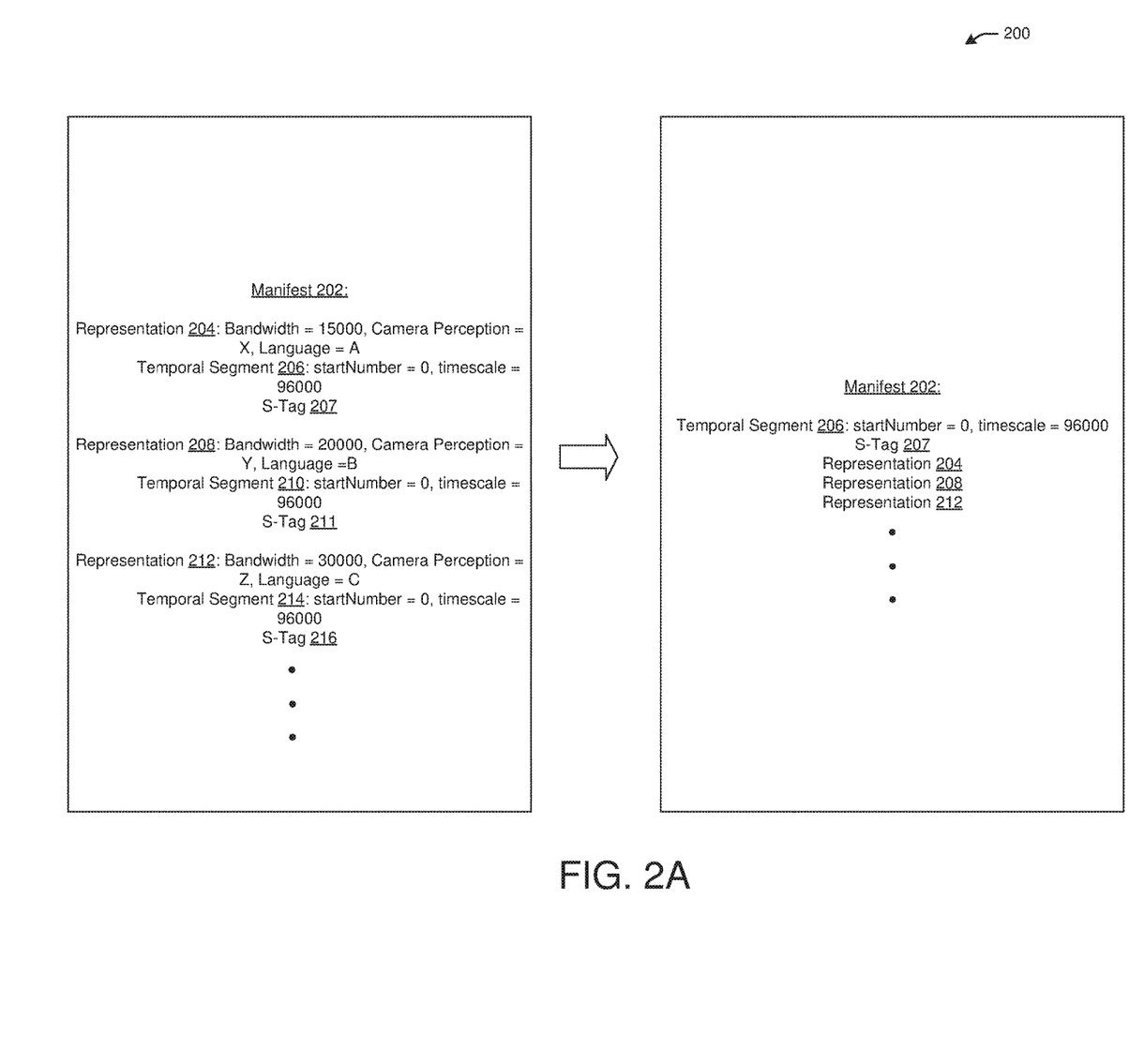
FIG. 2A illustrates example skip parsing of media manifests for streaming media, in accordance with one or more example embodiments of the present disclosure.

FIG. 2A illustrates example skip parsing 200 of media manifests for streaming media, in accordance with one or more example embodiments of the present disclosure.

Referring to FIG. 2A, a manifest may include multiple representations for different types/quality levels (e.g., standard definition, high definition, ultra-high definition, etc.), and a representation may reference a set of temporal segments using Segment Timeline. For example, the manifest 202 may include representation 204 having a corresponding bandwidth, camera position/field-of-view, and/or spoken language, a temporal segment 206 with start and end times, and an s-tag 207. The manifest 202 may include representation 208 having the same or another bandwidth, camera position/field-of-view, and/or spoken language, a temporal segment 210 having the same start and end times as the representation 204, and an s-tag 211. The manifest 202 may include representation 212 having the same or another bandwidth, camera position/field-of-view, and/or spoken language, a temporal segment 214 having the same start and end times as the representation 204, and an s-tag 216.

Still referring to FIG. 2A, the protocol of the manifest 202 may support a condensed form, allowing for skip parsing (e.g., by the parser 106 of FIG. 1) of the time-aligned representations of the manifest 202. As shown, the temporal segment 206 may include the representation 204, the representation 208, and the representation 212 for the same or different bandwidths, camera position/field-of-view, and/or spoken language, along with the s-tag 207, because the representations are temporally aligned (e.g., have the same start and end times). In this manner, parsing of the manifest 202 may allow for skip-parsing so that not all of the s-tags of the manifest 202 need parsing.

Figure 2B:
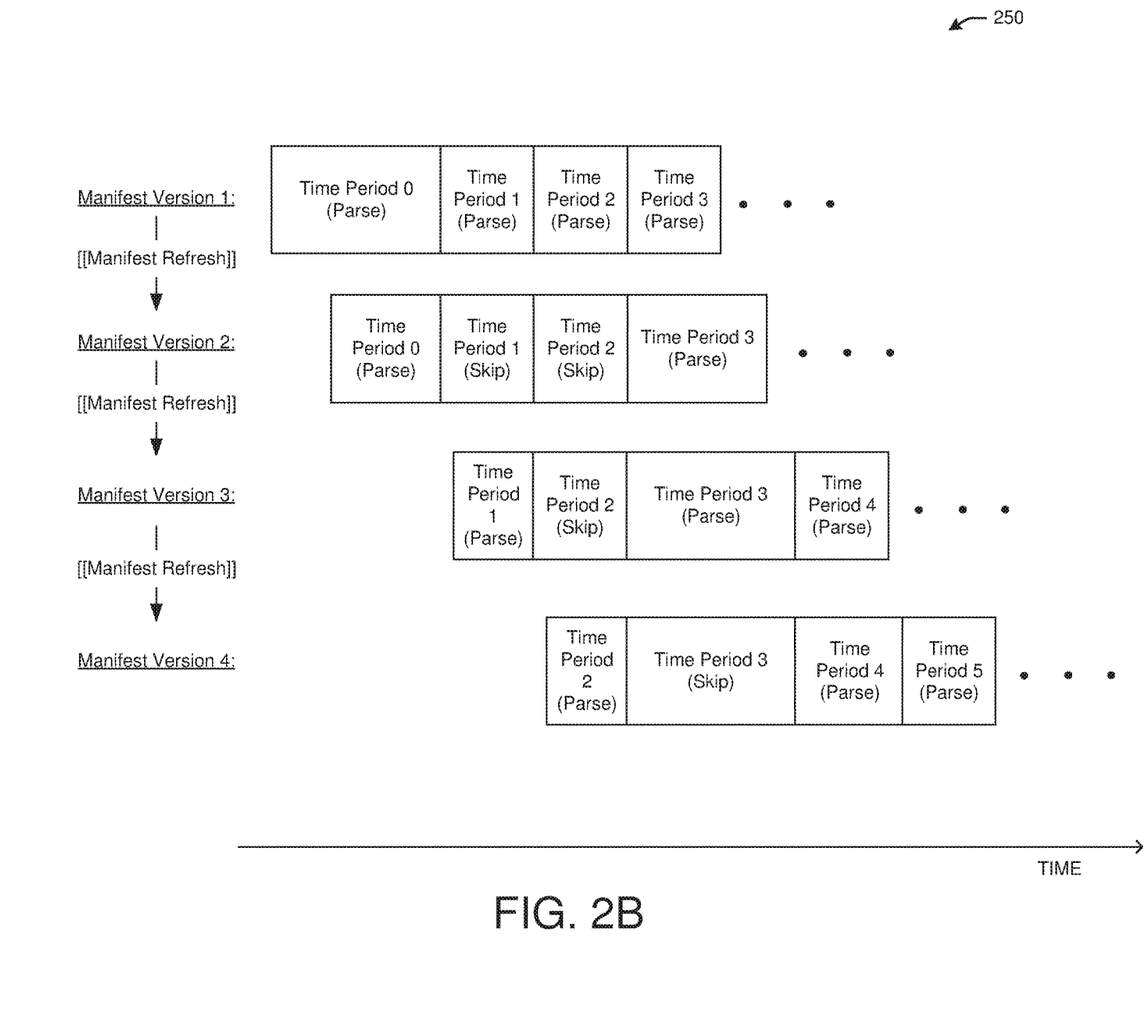
FIG. 2B illustrates example skip parsing based on video media refreshes for streaming media, in accordance with one or more example embodiments of the present disclosure.

FIG. 2B illustrates example skip parsing 250 based on media manifest refreshes for streaming media, in accordance with one or more example embodiments of the present disclosure.

Referring to FIG. 2B, a first version of a manifest (e.g., for time period 0) may include a segment for time period 0, a segment for time period 1, a segment for time period 2, a segment for time period 3, and so on. All segments of the first version of the manifest may be parsed (e.g., by the parser 106 of FIG. 1). However, after a refresh of the manifest results in a second version of the manifest with a shorter segment for time period 0 and a longer time period 3 (e.g., due to fragments added or removed), the parser may parse the modified segments for time period 0 and time period 3, while skipping the parsing of the segments for time periods 1 and 2 because those segments were unchanged from the refresh.

Still referring to FIG. 2B, another refresh may be applied to the manifest, resulting in a third version of the manifest with a shorter segment for time period 1, a longer segment for time period 3, and a new segment for time period 4. The modified segments for the time period 1 and the time period 3 may be parsed along with the newly added (e.g., not previously parsed) segment for time period 3. The unmodified segment for time period 2 may be skipped. After a subsequent refresh generates a fourth version of the manifest with a shorter segment for time period 2, a longer segment for time period 4, and a newly added segment for time period 5, the parser may parse the modified segments for time period 2 and time period 4, and may parse the newly added segment for time period 5, but may skip the parsing of the segment of time period 3 (e.g., because the segment of time period 3 was previously parsed and was not modified). In this manner, as a manifest refreshes, segments that were previously parsed and have not been modified may be skip-parsed, whereas modified segments and newly added segments (and their s-tags) may be parsed.

For example, during a live event, a media manifest may be refreshed to ensure that the player (e.g., the media player 104 of FIG. 1) is updated with the latest segments added at the live edge and removed from the trailing edge. When advertisements are dynamically inserted (e.g., representing any of the temporal segments shown), a manifest may include time segments that never change between successive refreshes of the manifest. In one or more embodiments, to address this scenario, the parsing strategy may result in parsing: (1) The first time period, to identify the segments which have fallen off the trailing edge; (2) Any new time period, which may include new (e.g., added) segments nearer the live edge; and (3) The last/latest time period, which includes the live edge and any new (e.g., added) segments. In this manner, skip parsing may avoid re-parsing previously parsed time periods that are unchanged in the latest manifest refresh (e.g., may refrain from re-parsing segments that were previously parsed and were unchanged—had no fragments added or removed after the segment was parsed and the manifest was subsequently refreshed).

Figure 2C:
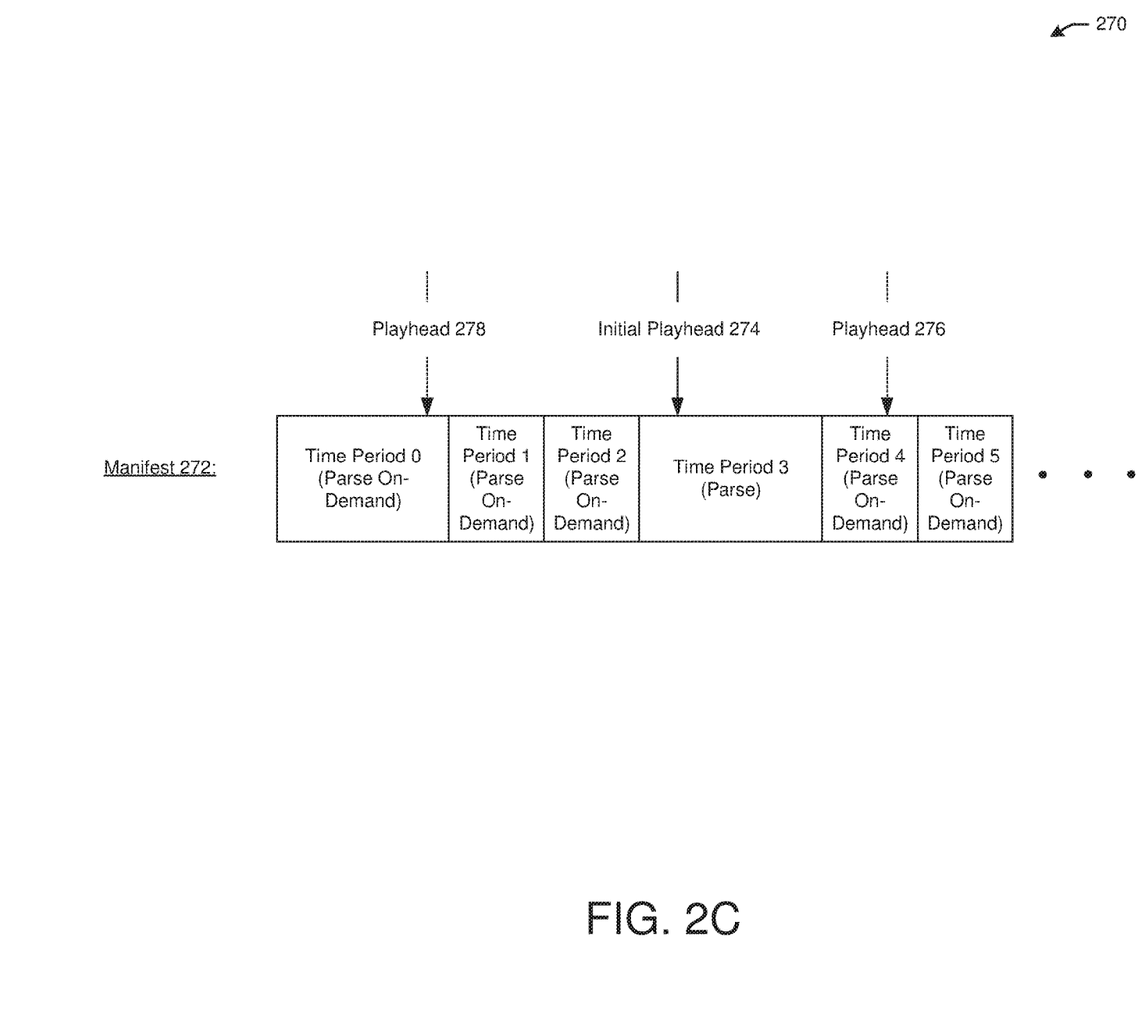
FIG. 2C illustrates example on-demand parsing of media manifests for streaming media, in accordance with one or more example embodiments of the present disclosure.

FIG. 2C illustrates example on-demand parsing 270 of media manifests for streaming media, in accordance with one or more example embodiments of the present disclosure.

Referring to FIG. 2C, a manifest 272 may include multiple temporal segments for a time period 0, for a time period 1, for a time period 2, for a time period 3, for a time period 4, for a time period 5, and so on. Whether or not to parse each segment (and corresponding s-tag) of the manifest 272 (e.g., using the parser 106 of FIG. 1) may depend on whether the segments need to be parsed in order to initialize media playback (e.g., based on a user preference, such as where to start playback). An initial playhead 274 (e.g., a position in time of the data being accessed) may begin during the time period 3, for example, necessitating parsing of the corresponding segment. The preceding and subsequent segments may be skipped during this parsing turn until the playhead position 276 advances in time (e.g., due to live playback or a fast forward input) to position 276 or jumps back in time to position 278 (e.g., representing user preferences). For example, when the playhead moves to position 278, the segment of the time period 0 may be parsed, and when the playhead moves to position 276, the segment of the time period 4 may be parsed.

For example, when starting playback, a player (e.g., the media player 104 of FIG. 1) may require only the time period that includes the live edge (e.g., the time period 3). In this situation, other time periods (and their temporal segments) may be skipped on the initial parse, but when a user requests a rewind or other time-skipping feature, the player may "lazily" parse segment tags on-demand, meaning that the parser may refrain from parsing some tags until they are needed (e.g., when playback progresses to a future temporal segment or is adjusted by a user request to rewind or skip forward in time). Similarly, initial playback quality levels at startup may be parsed based on the user's preferred quality level (or a default quality level) to minimize delays in starting the playback, while lazily parsing alternative/backup quality levels on-demand.

Referring to FIGS. 2A-2C, the parsing techniques may be applied to certain protocols, such as DASH. Similar parsing techniques may be applied to other protocols, such as shown in FIG. 2D.

Figure 2D:
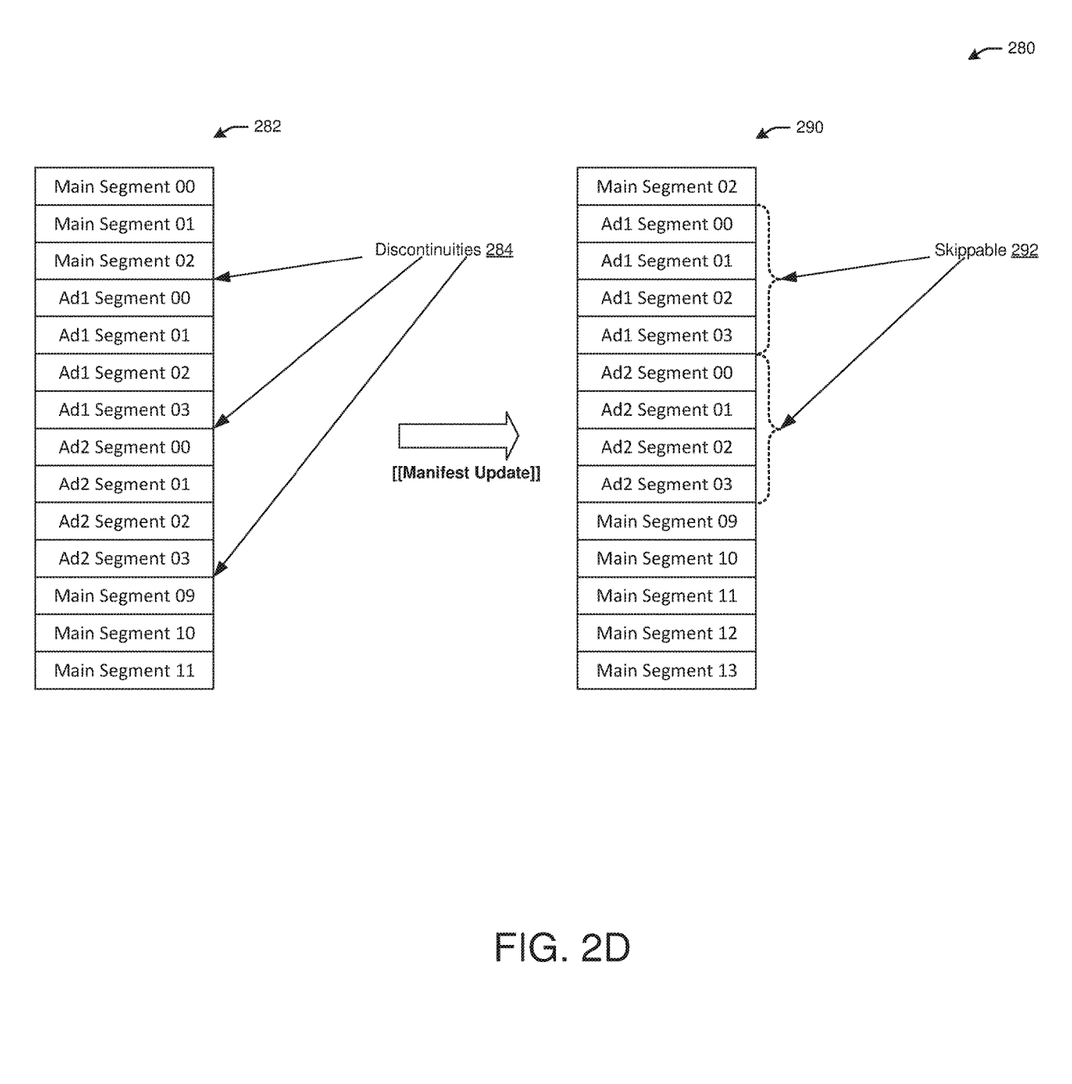
FIG. 2D illustrates example skip parsing of media manifests for streaming media, in accordance with one or more example embodiments of the present disclosure.

FIG. 2D illustrates example skip parsing 280 of media manifests for streaming media, in accordance with one or more example embodiments of the present disclosure.

Referring to FIG. 2D, a manifest 282 may include multiple segments in another protocol (e.g., HLS). Skip-parsing may be applied to the manifest 282 to avoid parsing all segments in one turn. For example, the manifest 282 may include main segments (e.g., live or media-on-demand content) and advertisement segments for multiple ads (e.g., ad1, ad 2, etc.). Discontinuities 284 may occur between main segments and ad segments, as shown. In a refresh of the manifest 282, segments may be added to the leading edge and/or removed from the trailing edge. In this manner, only a first trailing edge segment may need to be parsed. From the leading edge, segment addresses may be parsed backwards until the last-known (e.g., previously parsed) segment is matched. Middle discontinuities may not change between updates, and therefore may be skip-parsed.

Still referring to FIG. 2D, after the refresh, manifest 290 may be generated, and may no longer have some of the segments at the beginning, and may have newly added segments at the end. Because the ad segments in the middle may be unchanged from the manifest 282, the ad segments may be skip-parsed 292. In the example shown, the manifest 290 is incremented by two, so the trailing edge drops two segments that do not need to be re-parsed. The middle discontinuities 284 may be unchanged, allowing for skipping. The next discontinuity may trigger parsing beginning at the last segment (e.g., main segment 09) without re-parsing previous data.

Figure 3:
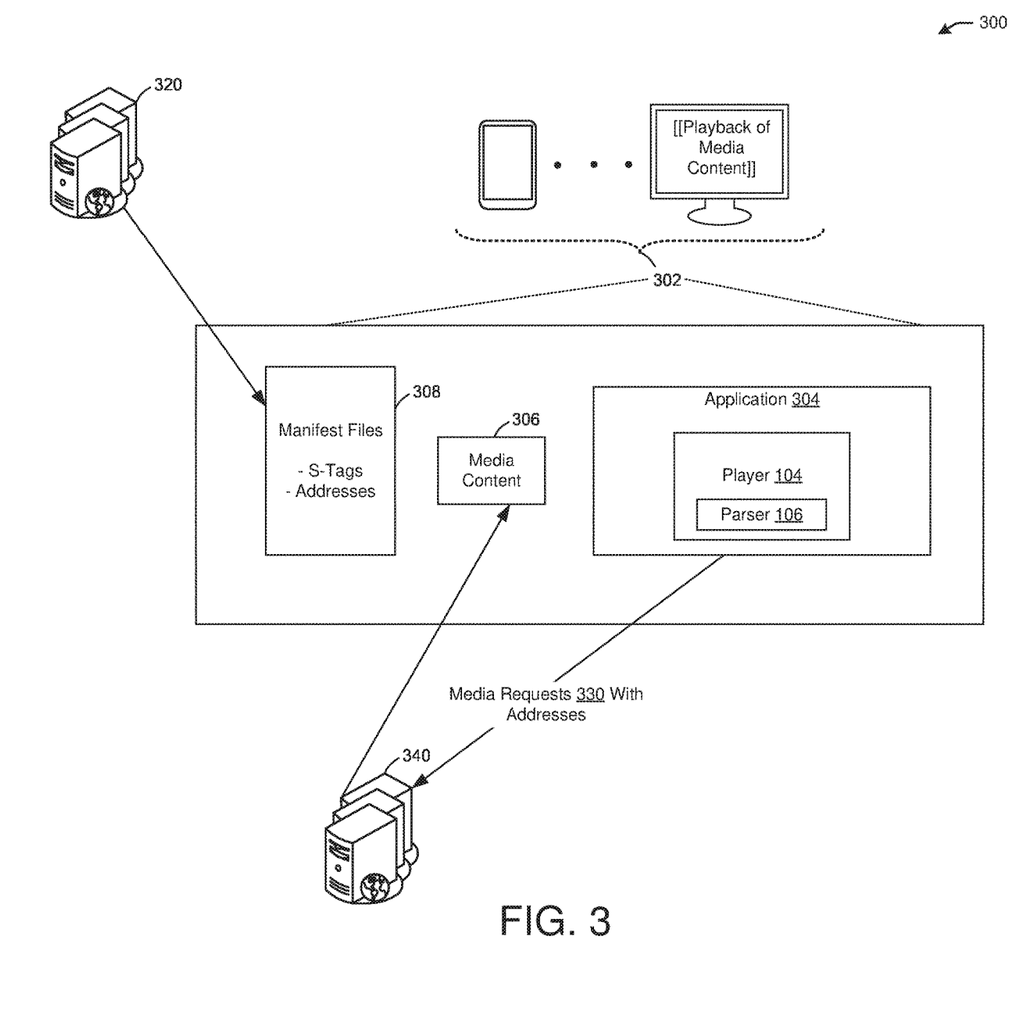
FIG. 3 illustrates an example system for parsing media manifests for streaming media, in accordance with one or more example embodiments of the present disclosure.

FIG. 3 illustrates an example system 300 for parsing media manifests for streaming media, in accordance with one or more example embodiments of the present disclosure.

Referring to FIG. 3, one or more devices 302 (e.g., similar to the device 102 of FIG. 1) may have or use a computer-executable application 304 (e.g., a streaming media application) with the media player 104 and the parser 106 of FIG. 1. The application may play media content 306 (e.g., audio segments, video frames, etc.), and the parser 106 may parse manifest files 308 provided by one or more remote devices 320 to identify and request the media content media content 306 needed for playback. The application 304 may send requests 330 for the media content media content 306 (e.g., a media title having a particular quality based on bandwidth, camera position/field-of-view, and/or spoken language, etc.) to one or more remote devices 340 that may store the media content media content 306. The requests 330 may include addresses (e.g., URLs) (e.g., of the one or more remote devices 340) identified by the manifest files 308, and used to retrieve the media content 306 from the addresses. The one or more remote devices 340 may send the requested media content media content 306 to the one or more devices 302 for playback by the application 304. In this manner, the parsing of the manifest files 308 may affect the timing of the requests 330 and arrivals of the media content media content 306, and therefore the timing of the playback of the media content media content 306.

In one or more embodiments, the parser 106 may skip (e.g., refrain from parsing), completely or temporarily (e.g., at least until a subsequent manifest is provided), parsing of some portions (e.g., s-tags) of the manifest files 308 to optimize manifest file parsing time. In particular, the parser 106 may skip the parsing of duplicative segment timelines indicated by s-tags (e.g., may parse an s-tag of a temporal segment of media of one quality/format, but skip parsing one or more other s-tags representing a temporal segment of the media in other qualities/formats, particularly when the temporal segments align in time), may skip parsing of non-updated temporal segments of a manifest (e.g., when a manifest is refreshed/updated with fragments added to and/or removed from temporal segments), or may perform on-demand parsing of child elements of a manifest file (e.g., may parse an s-tag whose temporal segment corresponds to the location at which the content is to begin playback, and may refrain from parsing a previous or subsequent s-tag whose temporal segment has already occurred in the media or will occur in the media at a later time). The details of the enhanced parsing mechanisms provide the benefit of reducing manifest parsing time to allow for faster commencement of playback with reduced content buffering, while allowing for parsing of tags representing temporal segments needed for immediate playback in both VOD and live streaming applications.

In one or more embodiments, the decision whether to skip parsing a portion of a manifest file may be based on any combination of what the parser 106 has learned from parsing and/or a user preference (e.g., a user preference for playback using a particular media resolution/quality corresponding to an available bandwidth, a user preference for where playback is to begin—live for a live-streaming event, from the beginning or at a different starting point of VOD content, a camera position/field-of-view, and/or a spoken language, etc.). For example, the manifest files 308 may provide a set of representations for different types/quality levels (e.g., standard definition, high definition, ultra-high definition, etc.), and a representation may reference a set of temporal segments using Segment Timeline. In some cases, the Segment Timeline may be duplicated across multiple (even all) representations of a set, such as when all temporal segments for the different types/quality levels align in time (e.g., the respective standard definition, high definition, and ultra-high definition temporal segments may cover the same time period). When the temporal alignment occurs, the parser 106 may parse one of the aligned temporal segments while skip parsing other aligned temporal segments (e.g., may parse the standard definition temporal segment while skip parsing the temporally aligned high definition and ultra-high definition temporal segments) to avoid parsing the Segment Timeline and any child elements (e.g., the S-tag elements). This embodiment can be seen in FIG. 2A.

During a live event, the media manifests 308 may be refreshed to ensure that the media player 104 is updated with the latest segments added at the live edge and removed from the trailing edge. When advertisements are dynamically inserted, a manifest may include time segments that never change between successive refreshes of the manifest. In one or more embodiments, to address this scenario, the parsing strategy may result in parsing: (1) The first time period, to identify the segments which have fallen off the trailing edge; (2) Any new time period, which may include new (e.g., added) segments nearer the live edge; and (3) The last/latest time period, which includes the live edge and any new (e.g., added) segments. In this manner, skip parsing may avoid re-parsing previously parsed time periods that are unchanged in the latest manifest refresh (e.g., may refrain from re-parsing segments that were previously parsed and were unchanged—had no fragments added or removed after the segment was parsed and the manifest was subsequently refreshed). This embodiment can be seen in FIG. 2B.

In one or more embodiments, data in the manifest files 308 may not be needed to initialize media playback, but the data may be needed later. For example, when starting playback, the media player 104 may require only the time period that includes the live edge. In this situation, other time periods (and their temporal segments) may be skipped on the initial parse, but when a user requests a rewind or other time-skipping feature, the player may "lazily" parse tags on-demand, meaning that the parser 106 may refrain from parsing some tags until they are needed (e.g., when playback progresses to a future temporal segment or is adjusted by a user request to rewind or skip forward in time). Similarly, initial playback quality levels at startup may be parsed based on the user's preferred quality level (or a default quality level) to minimize delays in starting the playback, while lazily parsing alternative/backup quality levels on-demand. This embodiment can be seen in FIG. 2C.

In one or more embodiments, the manifest files 308 may use formats other than DASH, such as HLS, for example. Similar to enhanced parsing of a DASH manifest, HLS parse skipping may be based on discontinuities and individual media segments. In particular, temporal segments may be added to a leading edge or removed from a trailing edge. Only the first trailing edge segment may need to be parsed. From the leading edge, segment addresses may be parsed backwards until a last known segment is matched. For example, if a manifest is refreshed/updated (e.g., incremented by two segments), the trailing edge may drop two segments that do not need to be re-parsed, and when the next (e.g., middle) segments are unchanged, the unchanged subsequent segments may be skipped until a next temporal segment has changed (e.g., incremented by two segments), resulting in a parsing of the changed temporal segment. In an example, if media content is playing, and one or more advertisement segments are unchanged after a manifest update, but the subsequent media after the advertisement segments has added segments, the advertisement segments may be skipped from parsing, but the subsequent media after the advertisement segments may be parsed without having to parse the previous advertisement segments. This embodiment can be seen in FIG. 2D.

In one or more embodiments, the one or more devices 302 may include a personal computer (PC), a smart home device, a wearable wireless device (e.g., bracelet, watch, glasses, ring, strap/band, patch, bandage, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, an ultra mobile device (UMD), an ultra mobile PC (UMPC), a mobile internet device (MID), an "origami" device or computing device, a device that supports dynamically composable computing (DCC), a context-aware device, a video device, an audio device, a media player, a smartphone, or the like.

Any of the one or more devices 302, the one or more remote devices 320, and/or the one or more remote devices 340 may be configured to communicate with each other via one or more communications networks, which may include any one of a combination of different types of suitable communications networks such as, for example, broadcasting networks, cable networks, public networks (e.g., the Internet), private networks, wireless networks, cellular networks, or any other suitable private and/or public networks.

In one or more embodiments, the system 300 may use a hypertext transfer protocol (HTTP) infrastructure to deliver the media content media content 306. The media content media content 306 may be delivered using an adaptive bitrate streaming technique in which the media contentmedia content 306 are delivered based on network conditions. For example, when bandwidth is sufficient, the media content 306 may be delivered using higher bitrates, and when bandwidth decreases, the bitrate of the media content 306 may decrease. When using DASH, the system 300 may be codec-agnostic (e.g., the media content 306 may be encoded with any coding format). Coding formats for the media content 306 may include H.265, H.264, VP9, MPEG, or other standardized coding formats. The coding of the media content 306 allow for compressed video data to be transmitted to the one or more devices 302, which may receive the encoded media content 306 and decode the media content 306 for playback. The system 300 is not limited to DASH, however, and may use other protocols such as HLS, smooth streaming, or HDS (which may not be codec-agnostic like DASH). For example, FIG. 2D provides a way to parse HLS manifests.

In one or more embodiments, the application 304 may support a variety of compression methods and formats, including streaming protocols like DASH, HLS, smooth streaming, HDS, etc. The application 304 may encode and/or decode the media content 306, and may transcode from one format to another.

Figure 4:
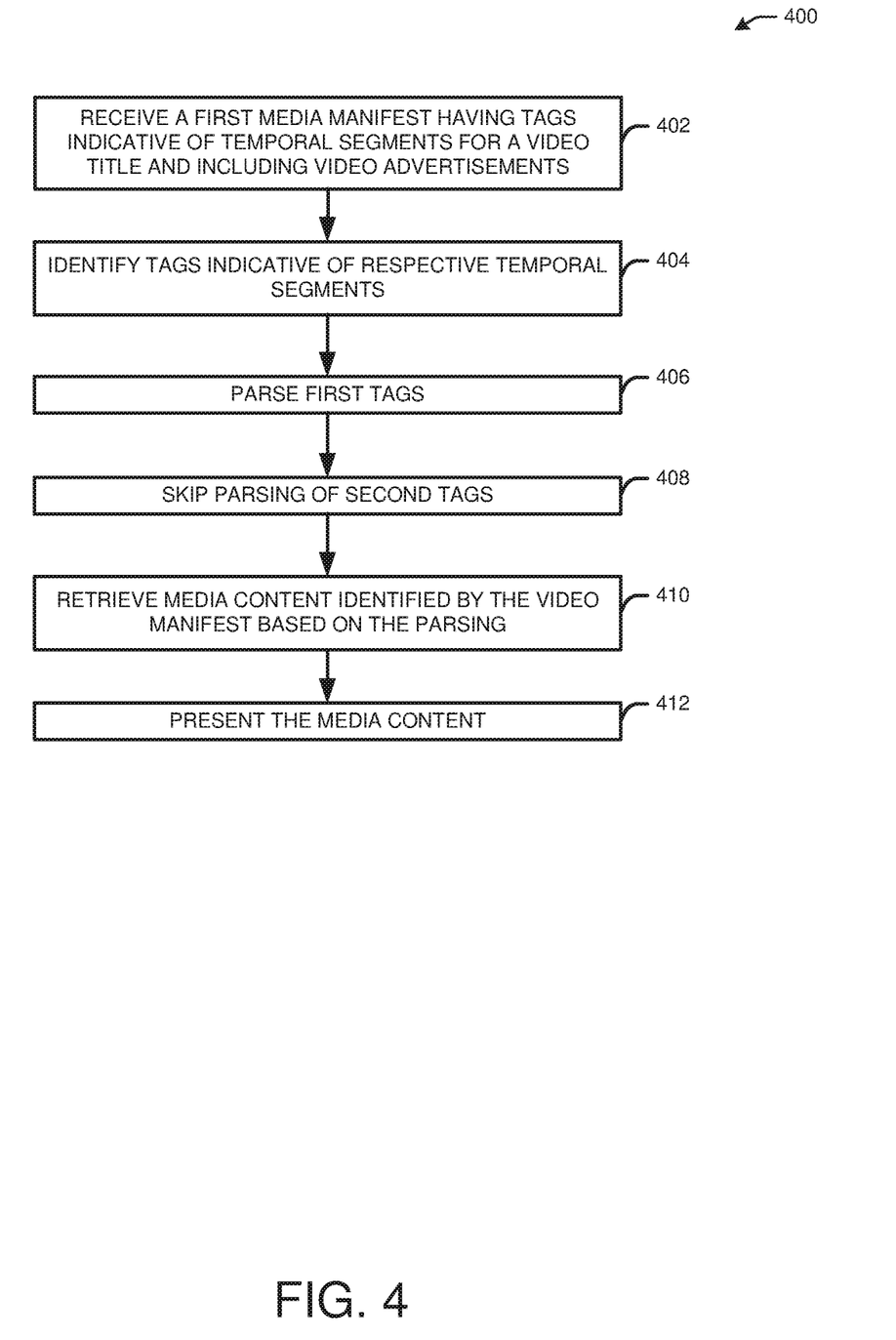
FIG. 4 illustrates a flow diagram for a process for parsing media manifests for streaming media, in accordance with one or more example embodiments of the present disclosure.

FIG. 4 illustrates a flow diagram for a process 400 for parsing media manifests for streaming media, in accordance with one or more example embodiments of the present disclosure.

At block 402, a device (e.g., having the application 304 of FIG. 3) may receive a first media manifest (e.g., of the manifest files 308 of FIG. 3) having tags indicative of first temporal segments for media content presentable using the media player, the first media manifest using a DASH, HLS, or other format/protocol, the media content including advertisements. The manifest may include temporal segments (e.g., see FIG. 2A) that may be aligned and/or unaligned, and that may or may not have been previously parsed by a parser of the device (e.g., the parser 106 of FIG. 1).

At block 404, the device may identify tags of the media manifest. For example, a parser of the device (e.g., the parser 106) may identify a first tag indicative of a first temporal segment of the first temporal segments, may identify a second tag indicative of a second temporal segment of the first temporal segments, and so on. The tags may represent temporal segments (e.g., see FIGS. 2A-2D), and may provide the starting and end times of the temporal segments (e.g., to use to determine when to request and play content), and addresses of media content that, when executed by the player, result in playback of the corresponding content (in a corresponding quality/format).

At block 406, the device may parse some tags, and at block 408, the device may skip parsing other tags and/or lazily parse other tags (e.g., on-demand). The parser may skip (e.g., refrain from parsing), completely or temporarily (e.g., at least until a subsequent manifest is provided), parsing of some portions (e.g., s-tags) of a manifest file to optimize manifest file parsing time. In particular, the parser may skip the parsing of duplicative segment timelines indicated by s-tags (e.g., may parse an s-tag of a temporal segment of media of one quality/format, but skip parsing one or more other s-tags representing a temporal segment of the media in other qualities/formats, particularly when the temporal segments align in time), may skip parsing of non-updated temporal segments of a manifest (e.g., when a manifest is refreshed/updated with fragments added to and/or removed from temporal segments), or may perform on-demand parsing of child elements of a manifest file (e.g., may parse an s-tag whose temporal segment corresponds to the location at which the content is to begin playback, and may refrain from parsing a previous or subsequent s-tag whose temporal segment has already occurred in the media or will occur in the media at a later time). The skip parsing may occur using the techniques and criteria in FIGS. 2A-2D, such as when segments align temporally (e.g., FIG. 2A), when the media manifest represents a refresh of a previous media manifest in which some temporal segments have been modified, added, and/or removed (e.g., FIGS. 2B and 2D), and/or lazily parse when the media manifest is used to initialize media playback (e.g., FIG. 2C). Whether to skip/lazily parse the media manifest may be based on whether the device previously has parsed a segment and/or based on a user preference indicative of a starting location for playback of first media content of the media content or a preferred bandwidth. The device may determine the user preference based on a user input/selection that commences playback (e.g., a user preference for playback using a particular media resolution/quality corresponding to an available bandwidth, a user preference for where playback is to begin—live for a live-streaming event, from the beginning or at a different starting point of VOD content, etc.).

At block 410, the device may request and retrieve media content (e.g., the media files 306 of FIG. 3) based on the addresses provided by the media manifest. For example, the media content 306 may be retrieved from URLs or other addresses, so the device may request the media content of a selected media title from the corresponding address(es) identified by the media manifest. In response to the requests, the player may receive the requested media content in the form of video frames and/or audio that may be played by the device at block 412. In this manner, the parsing of the media manifest may allow for faster, more efficient retrieval and playback of media content, improving a user's experience.

The descriptions herein are not meant to be limiting.

Figure 5:
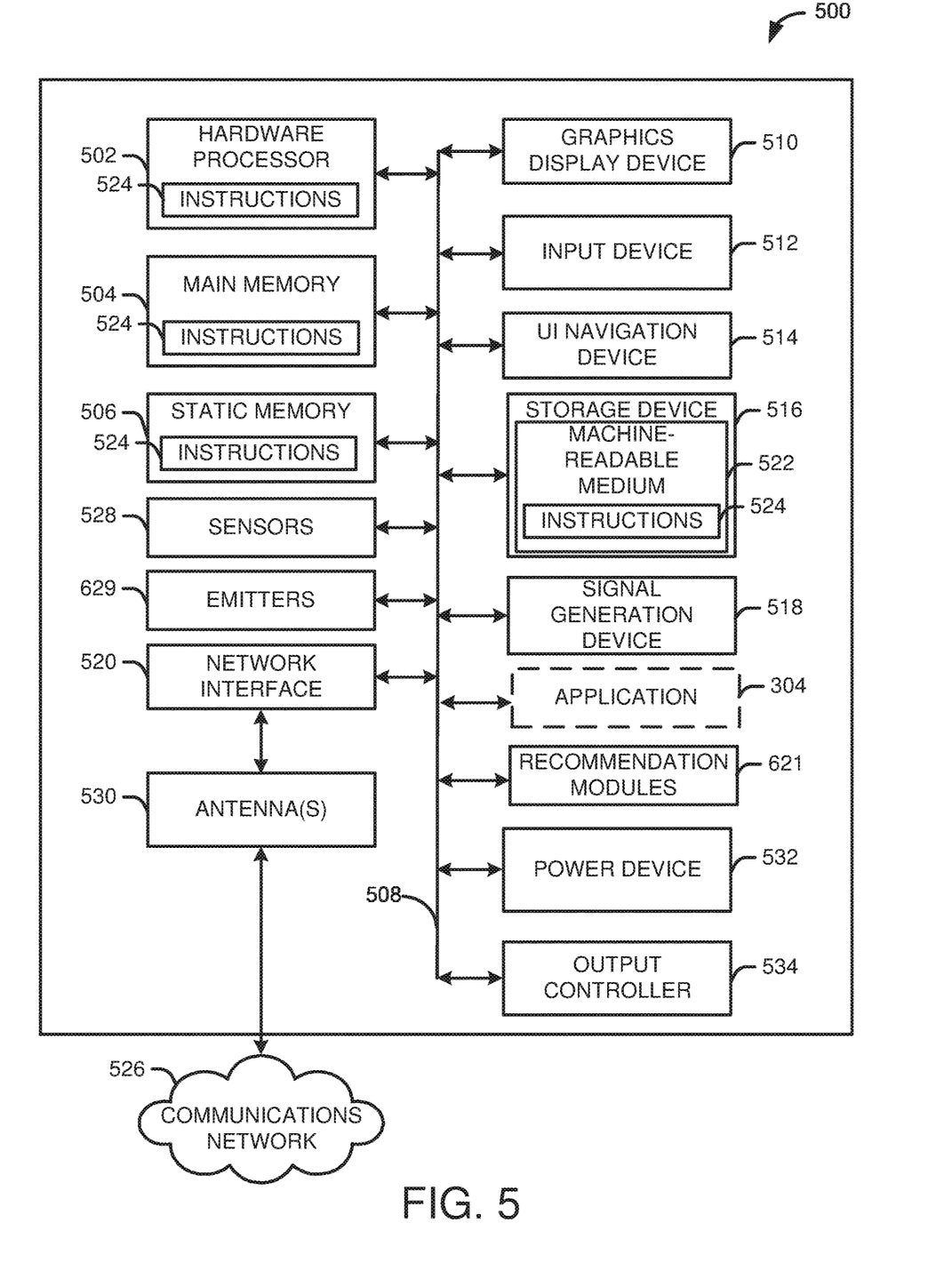
FIG. 5 illustrates a block diagram of an example machine upon which any of one or more techniques (e.g., methods) may be performed, in accordance with one or more example embodiments of the present disclosure.

FIG. 5 illustrates a block diagram of an example of a machine 500 (e.g., the device 102 of FIG. 1, the one or more devices 302 of FIG. 3, the one or more remote devices 320 of FIG. 3, the one or more remote devices 340 of FIG. 3) or system upon which any one or more of the techniques (e.g., methodologies) discussed herein may be performed. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in Wi-Fi direct, peer-to-peer (P2P), cellular, (or other distributed) network environments. The machine 500 may be a client device, a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518, the application 304 (e.g., when used as a playback device for playing media content), a network interface device/transceiver 520 coupled to antenna(s) 530, one or more sensors 528. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:

receiving, by at least one processor associated with a media player, a first video manifest comprising tags indicative of first temporal segments for video titles presentable using the media player, the first video manifest using a Dynamic Adaptive Streaming over HTTP (DASH) format and defining start times and durations of the first temporal segments;

identifying, using a parser associated with the media player, a first tag indicative of a first temporal segment of the first temporal segments;

identifying, using the parser, a second tag indicative of a second temporal segment of the first temporal segments;

determining, by the at least one processor, a user preference, the user preference indicative of a starting location for playback of a first video title of the video titles or a preferred bandwidth, a preferred camera perception, or a preferred language;

parsing, using the parser, the first tag;

based on at least one of the parsing or the user preference, determining, by the at least one processor, a first start time and a first duration of the first temporal segment as defined by the first video manifest and a second start time and a second duration of the second temporal segment as defined by the first video manifest;

determining, by the at least one processor, based on the first start time and the first duration of the first temporal segment, and the second start time and the second duration of the second temporal segment as defined by the first video manifest, that the first temporal segment and the second temporal segment at least partially align temporally;

based on determining that the first temporal segment and the second temporal segment at least partially align temporally, determining, by the at least one processor, not to parse the second tag;

retrieving, by the at least one processor, based on the first start time of the first temporal segment, a DASH address of the first video title; and presenting, by the at least one processor, the first video title based on the DASH address.

2. The method of claim 1, wherein the first temporal segment uses at least one of a first bandwidth, a first camera perception, or a first language, and wherein the second temporal segment uses a second bandwidth, a second camera perception, or a second language.

3. The method of claim 1, wherein the parsing of the first tag occurs prior to receiving the first video manifest, the method further comprising:

parsing the second tag prior to receiving the first video manifest;

receiving a second video manifest after receiving the first video manifest, the second video manifest comprising second tags indicative of second temporal segments for the video titles;

determining, based on the second video manifest, that a fragment has been added to or removed from the first tag;

determining, based on the second video manifest, that no fragment has been added to or removed from the second tag; and re-parsing the first tag based on the determination that the fragment has been added to or removed from the first tag, wherein determining not to parse the second tag is further based on the determination that no fragment has been added to or removed from the second tag.

4. The method of claim 1, the method further comprising:

determining that the first temporal segment occurs at the starting location, the second temporal segment occurring after the first temporal segment, wherein parsing the first tag is based on the first temporal segment occurring at the starting location, and wherein determining not to parse the second tag is further based on the first temporal segment occurring at the starting location and the second temporal segment occurring after the first temporal segment.

5. A method comprising:

receiving, by at least one processor associated with a media player, a first media manifest comprising tags indicative of first temporal segments for media titles presentable using the media player, and defining start times and duration of the first temporal segments;

identifying, using a parser associated with the media player, a first tag indicative of a first temporal segment of the first temporal segments;

identifying, using the parser, a second tag indicative of a second temporal segment of the first temporal segments;

parsing, using the parser, the first tag;

based on at least one of the parsing or a user preference indicative of a starting location for playback of a first media title of the media titles or a preferred bandwidth, a preferred camera perception, or a preferred language, determining, by the at least one processor, a first start time and a first duration of the first temporal segment and a second start time and a second duration of the second temporal segment as defined by the first media manifest;

determining, based on the first start time and the first duration of the first temporal segment, and the second start time and the second duration of the second temporal segment as defined by the first media manifest, that the first temporal segment and the second temporal segment at least partially align temporally;

determining, based on the first temporal segment and the second temporal segment at least partially aligning temporally, not to parse the second tag;

retrieving, by the at least one processor, based on the first start time of the first temporal segment, an address of the first media title; and presenting, by the at least one processor, the first media title based on the address.

6. The method of claim 5, wherein the starting location is associated with a live edge, and wherein the first media title is live content.

7. The method of claim 5, wherein the starting location is the first start time of the first media title.

8. The method of claim 5, wherein the second temporal segment is associated with presentation of a video advertisement.

9. The method of claim 5, wherein the second temporal segment is associated with presentation of the first media title.

10. The method of claim 5, wherein the first temporal segment uses at least one of a first bandwidth, a first camera perception, or a first language, and wherein the second temporal segment uses a second bandwidth, a second camera perception, or a second language.

11. The method of claim 5, wherein the parsing of the first tag occurs prior to receiving the first media manifest, the method further comprising:

parsing the second tag prior to receiving the media manifest;

receiving a second media manifest after receiving the second media manifest, the second media manifest comprising second tags indicative of second temporal segments for the media titles;

determining, based on the second media manifest, that a fragment has been added to or removed from the first tag;

determining, based on the second media manifest, that no fragment has been added to or removed from the second tag; and re-parsing the first tag based on the determination that the fragment has been added to or removed from the first tag, wherein determining not to parse the second tag is further based on the determination that no fragment has been added to or removed from the second tag.

12. The method of claim 5, the method further comprising:

determining, based on the first start time defined by the first media manifest, that the first temporal segment occurs at the starting location, the second temporal segment occurring after the first temporal segment, wherein parsing the first tag is based on the first temporal segment occurring at the starting location, and wherein determining not to parse the second tag is further based on the first temporal segment occurring at the starting location and the second temporal segment occurring after the first temporal segment.

13. The method of claim 12, further comprising:
determining, after determining not to parse the second tag, that playback of the first media title has reached a second location after the starting location; and
parsing the second tag.

14. The method of claim 5, further comprising:
receiving a second media manifest comprising second tags indicative of second temporal segments for the media titles;
identifying a third tag indicative of a third temporal segment of the temporal segments, the third tag absent from the first media manifest; and
parsing the third tag based on the third tag being present in the second media manifest and absent from the first media manifest.

15. The method of claim 5, wherein the first media manifest uses a Dynamic Adaptive Streaming over HTTP (DASH) format, an HTTP Live Streaming (HLS) format, or a Smooth Streaming format.

16. The method of claim 5, wherein the parser is a Document Object Model parser or a Simple application programming interface (API) for extensible mark-up language (XML) (SAX) parser.

17. A media player system comprising:
a parser; and
memory coupled to at least one processor, the at least one processor configured to:
receive, a first media manifest comprising tags indicative of first temporal segments for media titles presentable using the media player system, and defining start times and duration of the first temporal segments;
identify, using the parser, a first tag indicative of a first temporal segment of the first temporal segments;
identify, using the parser, a second tag indicative of a second temporal segment of the first temporal segments;
parse, using the parser, the first tag;
based on at least one of the parsing or a user preference indicative of a starting location for playback of first media title of the media titles or a preferred bandwidth, determine a first start time and a first duration of the first temporal segment, and a second start time and a second duration of the second temporal segment as defined by the first media manifest;
based on the first start time and the first duration of the first temporal segment relative to the second start time and the second duration of the second temporal segment as defined by the first media manifest,
determine that the first temporal segment and the second temporal segment at least partially align temporally;
based on the first temporal segment and the second temporal segment at least partially aligning temporally, determine not to parse the second tag;
retrieve, based on the first start time of the first temporal segment, an address of the first media title; and
present the first media title based on the address.

18. The media player system of claim 17, wherein the first temporal segment uses at least one of a first bandwidth, a first camera perception, or a first language, wherein the second temporal segment uses a second bandwidth, a second camera perception, or a second language.

19. The media player system of claim 17, wherein the parsing of the first tag occurs prior to receiving the first media manifest, and wherein the at least one processor is further configured to:
parse, using the parser, the second tag prior to receiving the media manifest;
receive a second media manifest after receiving the first media manifest, the second media manifest comprising second tags indicative of second temporal segments for the media titles;
determine, based on the second media manifest, that a fragment has been added to or removed from the first tag;
determine, based on the second media manifest, that no fragment has been added to or removed from the second tag; and
re-parse, using the parser, the first tag based on the determination that the fragment has been added to or removed from the first tag,
wherein determining not to parse the second tag is further based on the determination that no fragment has been added to or removed from the second tag.

20. The media player system of claim 17, wherein the at least one processor is further configured to:
determine, based on the first start time defined by the first media manifest, that the first temporal segment occurs at the starting location, the second temporal segment occurring after the first temporal segment,
wherein to parse the first tag is based on the first temporal segment occurring at the starting location, and
wherein determining not to parse the second tag is further based on the first temporal segment occurring at the starting location and the second temporal segment occurring after the first temporal segment.

* * * * *